Aug. 1, 1950   H. W. G. SALINGER   2,516,921
ELECTROSTATIC DEVICE FOR MEASURING RADIANT POWER
Filed April 29, 1946   2 Sheets-Sheet 1
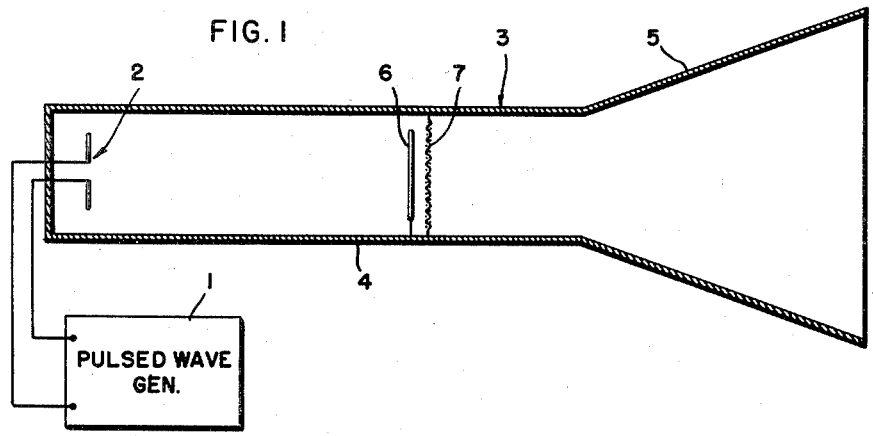
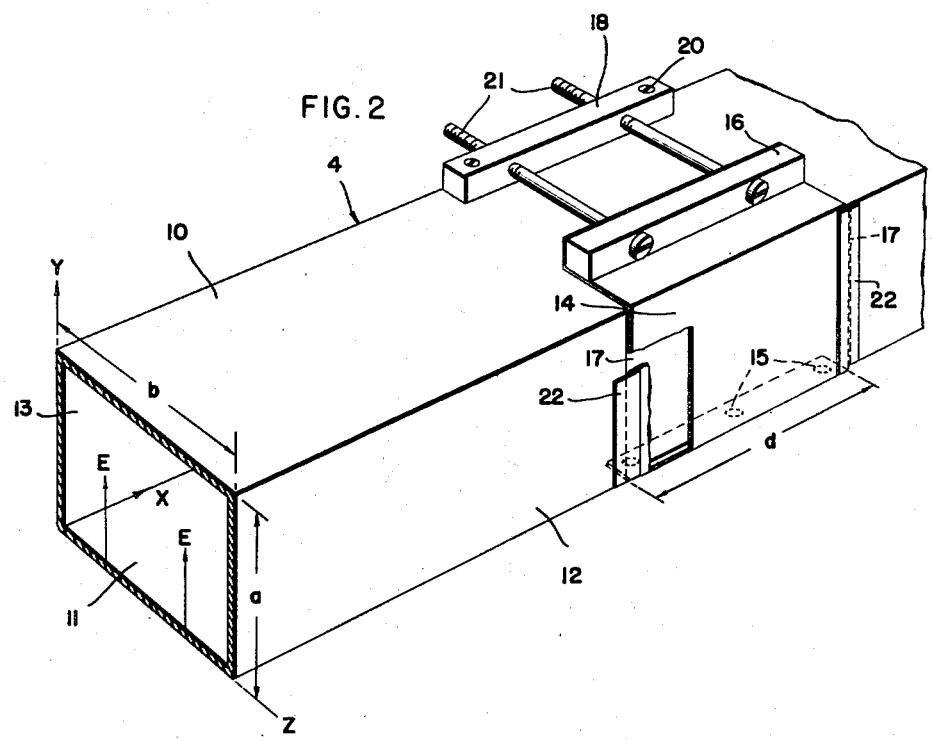
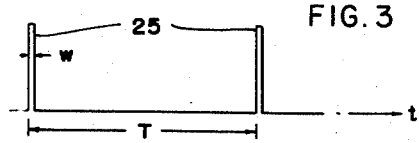
INVENTOR
HANS W. G. SALINGER
BY
ATTORNEY

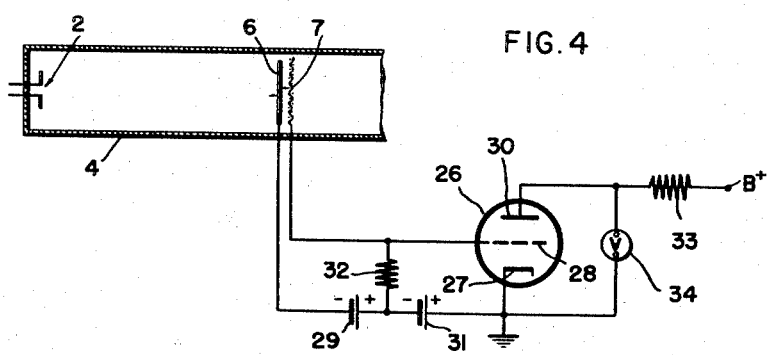
FIG. 4
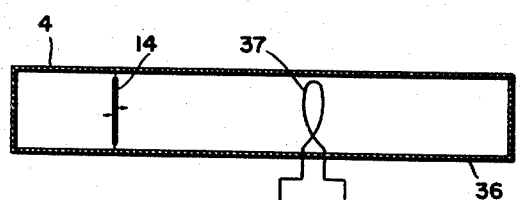
FIG. 5
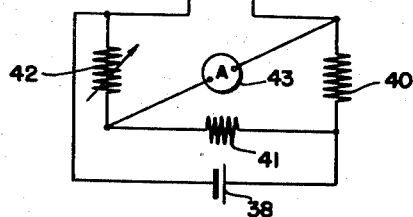
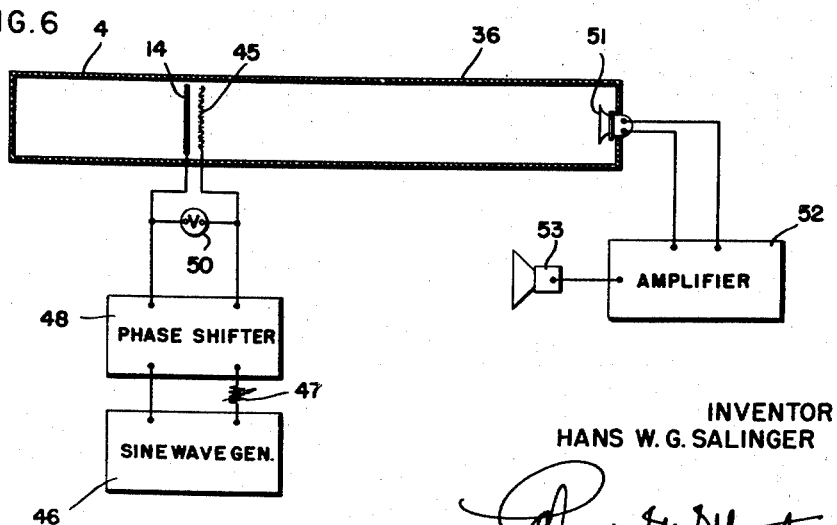
FIG. 6
INVENTOR
HANS W. G. SALINGER
BY
ATTORNEY Patented Aug. 1, 1950

2,516,921

UNITED STATES PATENT OFFICE 2,516,921

ELECTROSTATIC DEVICE FOR MEASURING RADIANT POWER

Hans W. G. Salinger, Fort Wayne, Ind., assignor, by mesne assignments, to Farnsworth Research Corporation, a corporation of Indiana Application April 29, 1946, Serial No. 665,882

5 Claims. (Cl. 171—95)

1

This invention relates generally to measuring devices, and particularly relates to a method of and apparatus for measuring the radiant power of an electromagnetic wave which may be interrupted at an audio frequency.

The problem frequently arises of measuring the power output of a transmitter. To this end, it has been proposed to determine the field strength of the electromagnetic field developed by the transmitting antenna by means of a receiving antenna. This is conventionally effected by comparing the response obtained in the receiver due to the wave to be measured with the known output of a local oscillator or with the response obtained from a standard field generator. These methods may be adapted for continuously measuring or recording the power output of an electromagnetic wave. However, when the power of an ultra-high frequency wave is measured with a receiver connected to a loop antenna, the data obtained are unreliable. Another drawback of this conventional method is that it is difficult to calibrate a receiver utilized for field strength measurements in terms of the absolute power radiated by the transmitter.

It has also been suggested to use calorimetric methods for measuring the radiant power of a transmitter. Thus, it is possible to measure the radiant power of an ultra-high frequency wave. Usually the entire power output of a transmitter is absorbed by a calorimetric device, the temperature rise of which is determined for a certain length of time. Accordingly, this method does not permit the continuous recording of the output of the transmitter. Another difficulty is that the entire power output of the transmitter must be utilized for measuring purposes, in which case no wave can be radiated. Alternatively, a certain fraction of the power output may be measured calorimetrically but now the problem arises of determining the percentage of the total power which is measured. Usually the measuring device is arranged near the transmitter so that the wave pattern of the radiated wave is disturbed, particularly when an ultra-high frequency wave is measured. A further drawback of all conventional methods for measuring radiant power is that power must be abstracted from the electromagnetic field which, in some cases, may be an appreciable portion of the total power output of the transmitter.

Frequently a wave is radiated into space which is interrupted at an audio frequency. Thus, an ultra-high frequency wave utilized in a radar system is conventionally interrupted at an audio frequency which may be of the order of 1000 cycles per second. In this case, the pulsating mechanical force exerted by the interrupted wave may be used in accordance with the present invention for measuring purposes.

It is the principal object of the present invention, therefore, to provide a novel method of and apparatus for continuously measuring the power of an electromagnetic wave radiated into space.

Another object of the invention is to provide a measuring device for continuously determining the radiant power of a pulsed electromagnetic wave without disturbing the wave pattern.

A further object of the invention is to provide means for measuring the power of an electromagnetic field, developed by a wave interrupted at an audio frequency and propagated into space, without abstracting power from the field.

In accordance with the present invention, there is provided a power measuring device comprising means for developing an electromagnetic wave and means for propagating the wave to provide an associated electromagnetic field. A member provided in the electromagnetic field is responsive to the mechanical force exerted by the wave, and means are provided for determining the mechanical force acting on the member.

For a better understanding of the invention, together with other and further objects thereof, reference is made to the following description, taken in connection with the accompanying drawings, and its scope will be pointed out in the appended claims.

In the accompanying drawings:

Fig. 1 is a sectional view of a wave guide arranged for radiating an ultra-high frequency wave into space and provided with a power measuring device embodying the present invention;

Fig. 2 is a view in perspective of a fragmentary portion of a wave guide provided with a vibratory wall portion in accordance with the invention;

Fig. 3 is a graph illustrating the force of a radiated wave plotted against time;

Fig. 4 is a sectional view of a fragmentary portion of a wave guide provided with a power measuring device and associated electric circuit;

Fig. 5 is a cross-sectional view of a wave guide associated with a tuned air column responsive to the vibrations of a diaphragm forming part of the wave guide and including velocity responsive means for measuring the amplitude of the velocity loop of the air column; and Fig. 6 is a view similar to Fig. 5 and including means for compensating the mechanical force acting on the diaphragm and a pressure responsive microphone for determining whether the diaphragm is motionless.

Referring now to Fig. 1 of the drawings, there is illustrated wave generator 1 which is arranged for developing an electromagnetic wave, preferably of ultra-high frequency, which is interrupted at an audio frequency. The rate of interruption of the wave developed by generator 1 may be of the order of 1000 cycles per second, as is conventional in a radar transmitter. Generator 1 is coupled to exciting antenna 2 which may, for example, consist of a dipole as illustrated. Antenna 2 excites wave guide 3 which comprises a portion 4 having a rectangular cross-section and horn 5 for radiating the wave developed by generator 1 into space.

In accordance with the present invention, member 6, which is free to vibrate mechanically, may be arranged in wave guide 3. Member 6 may, for example, consist of a reed tuned to the interrupting frequency of the wave developed by generator 1. Tuned reed 6 preferably occupies only a small portion of the cross-sectional area of wave guide 4 to minimize distortion of the wave pattern. Tuned reed 6 may consist of any suitable material which either absorbs or reflects electromagnetic energy at the frequency of the wave to be measured. Thus, tuned reed 6 may, for example, consist of a metal, such as copper or silver, which is a good conductor of electricity and which will therefore reflect an ultra-high frequency electromagnetic wave.

As will be explained hereinafter, the wave propagated through wave guide 3 exerts a mechanical force on tuned reed 6 which is proportional to Poynting's vector. Since the wave developed by generator 1 is interrupted at an audio frequency, tuned reed 6 will be acted upon by a periodic pulsating force thereby to cause reed 6 to vibrate mechanically. For the purpose of measuring the amplitude of the mechanical vibrations of tuned reed 6 there may be provided stationary plate or wire grid 7.

Referring now to Fig. 2, there is illustrated a fragmentary portion of wave guide 4 comprising top wall 10, bottom wall 11 and side walls 12 and 13. At will be explained hereinafter, the electromagnetic wave developed by generator 1 and traveling through wave guide 4 will also exert a mechanical force upon its walls 10, 11, 12 and 13. Walls 10, 11, 12 and 13 of wave guide 4 may consist of a metal which is a good conductor of electricity, such as copper or silver.

Diaphragm 14 is arranged to be responsive to the mechanical force exerted by the electromagnetic wave traveling through wave guide 4. Diaphragm 14 may, for example, consist of a thin sheet or foil of Duralumin which may be secured to bottom wall 11 by rivets 15 and which is stretched over the edge of top wall 10 and secured to movable bar 16. Diaphragm 14 replaces a portion of side wall 12 which has been cut away as indicated at 17, 17.

Movable bar 16 may be drawn toward stationary bar 18 fixed to top wall 10 by screws 20. By means of bolts 21 the tension of diaphragm 14 may be adjusted by increasing or decreasing the distance between bars 16 and 18, thereby to tune mechanically diaphragm 14 to the audio frequency at which the wave traveling through wave guide 4 is interrupted. The gaps between side wall 12 and diaphragm 14 may be covered with thin copper foils indicated at 22 so that side wall 12, copper foils 22 and diaphragm 14 form a continuous electrically conducting surface.

The electromagnetic wave propagated through wave guide 4 exerts a mechanical force on walls 10, 11, 12 and 13 of the wave guide. The magnitude of this mechanical force exerted by the electromagnetic field will now be calculated. It is well-known that waves of various transmission modes may be propagated through a wave guide such as 4. For the following calculations only those modes of transmission will be considered which have a component of the magnetic field in the direction of propagation but no component of the electric field in that direction. These modes of transmission are known generally as TE waves, that is, transverse electric waves. In particular, the $TE_{0,1}$ wave will now be considered, the double-subscripts denoting in the case of a rectangular wave guide the number of half-period variations of the fields along the $y$ and $z$ axes, respectively.

The $x$, $y$ and $z$ axes are indicated in Fig. 2, where $a$ denotes the height of wave guide 4 and $b$, its width. $d$ is the length of diaphragm 14 which, accordingly, has the area $A=ad$. The electromagnetic wave propagates through rectangular wave guide 4 in the direction of the $x$ axis. The electric field intensity, E, is directed along the $y$ axis as illustrated in Fig. 2.

The notation used in the following equations is that of the book "Ultra-High Frequency Techniques" by Brainerd, Koehler, Reich and Woodruff, published by D. Van Nostrand Company, Inc., New York, in 1942. The electric field components $E_x$, $E_y$, $E_z$ and the magnetic field components $H_x$, $H_y$, $H_z$ are taken in the direction of the three coordinates and may be expressed according to page 465 of the above publication as follows:

$$E_x = E_z = H_y = 0$$

$$E_y = \frac{\mu\omega}{\beta}H_z = B\frac{\mu\omega b}{\pi}\sin\frac{\pi z}{b}\sin(\omega t - \beta x) \quad (1)$$

$$H_x = -B\cos\frac{\pi z}{b}\cos(\omega t - \beta x)$$

In the above equations, B is an amplitude coefficient or the maximum value of the magnetic field which is measured in amp. turns/m. (the mks.-system is used); $\mu$ is the magnetic permeability which equals $$1.26 \times 10^{-6} \frac{\text{henry}}{\text{meter}}$$

$\omega = 2\pi f$ and denotes the angular velocity measured in radians per second, while $f$ is the frequency of the wave in cycles per second, $t$ is a variable indicating time, and $\beta$, the propagation phase constant, is given by the following equation:

$$\beta = \frac{2\pi}{\lambda g} = \frac{2\pi}{\lambda}\sqrt{1-\left(\frac{\lambda}{2b}\right)^2} = \frac{\omega}{c}\sqrt{1-\frac{\pi^2 c^2}{\omega^2 b^2}} \quad (2)$$

In Equation 2, $c$ is the light velocity in free space which equals $3\times 10^8$ m./sec., where $$c^2 = \frac{1}{\mu\epsilon}$$

$\epsilon$ is the dielectric constant, $\lambda$ is the wave length in free space while $\lambda_g$ is the wave length in wave guide 4. The cut-off wave length is $\lambda_0 = 2b$ for the transmission mode $TE_{0,1}$ under consideration. For a wave guide of rectangular cross section, this cut-off wave length is the smallest of any possible mode of transmission.

The mechanical forces exerted by an electromagnetic field may be derived from Maxwell's tensor:

$$\begin{pmatrix} p_{xx} p_{xy} p_{xz} \\ p_{yx} p_{yy} p_{yz} \\ p_{zx} p_{zy} p_{zz} \end{pmatrix} = \begin{pmatrix} \frac{1}{2}(\epsilon E^2 + \mu H^2) - \epsilon E_x^2 - \mu H_x^2, & -(\epsilon E_x E_y + \mu H_x H_y), & -(\epsilon E_x E_z + \mu H_x H_z) \\ -(\epsilon E_x E_y + \mu H_x H_y), & \frac{1}{2}(\epsilon E^2 + \mu H^2) - \epsilon E_y^2 - \mu H_y^2, & -(\epsilon E_y E_z + \mu H_y H_z) \\ -(\epsilon E_x E_z + \mu H_x H_z), & -(\epsilon E_y E_z + \mu H_y H_z), & \frac{1}{2}(\epsilon E^2 + \mu H^2) - \epsilon E_z^2 - \mu H_z^2 \end{pmatrix} \quad (3)$$

In accordance with Equation 3 a force $-p_{yy}$ is exerted per unit cross-section of top wall 10 of wave guide 4, that is, in a plane where $y=a$. On an area unity of side wall 12 ($z=b$) the force exerted is $-p_{zz}$. By substituting Equation 1 into Equation 3 we obtain:

$$-p_{yy} = -\frac{1}{2}(\epsilon(E_x^2 + E_z^2 - E_y^2) + \mu(H_x^2 + H_z^2 - H_y^2)) = \frac{1}{2}\epsilon E_y^2 - \frac{1}{2}\mu(H_x^2 + H^2)$$

$$-p_{zz} = -\frac{1}{2}(\epsilon(E_x^2 + E_y^2 - E_z^2) + \mu(H_x^2 + H_y^2 - H_z^2)) = -\frac{1}{2}\epsilon E_y^2 - \frac{1}{2}\mu(H_x^2 - H_z^2) = -\frac{1}{2}\mu H_z^2 \quad (4)$$

In Equation 4 the last equality results from the fact that in the plane $z=b$, that is, in side wall 12 of the wave guide, $E_y = H_z = 0$.

When Equation 1 is substituted into Equation 4, the expression for $p_{zz}$ in the plane $z=b$, that is, for side wall 12 becomes:

$$p_{zz} = \frac{\mu}{2} B^2 \cos^2(\omega t - \beta x) = \frac{\mu}{4} B^2 (1 + \cos 2(\omega t - \beta x))$$

In the above equation, the alternating part of the pressure may be disregarded, that is, the cosine. Thus the total force, F, on diaphragm 14 of height, $a$, and length, $d$, is:

$$F = \frac{\mu}{4} B^2 \, ad = \frac{\mu}{4} B^2 A \quad (5)$$

From Equations 1 and 4, we obtain the following expression for $p_{yy}$, the pressure acting on top wall 10.

$$p_{yy} = \frac{1}{2} E_y^2 \left( -\epsilon + \frac{\mu B^2}{\mu^2 \omega^2} \right) + \frac{1}{2} \mu H_z^2$$

But $$\frac{B^2}{\mu \omega^2} - \epsilon = \frac{1}{\mu}\left( \frac{B^2}{\omega^2} - \frac{1}{c^2} \right) = -\frac{1}{\mu} \frac{\pi^2}{\omega^2 b^2}$$

and it follows that $$p_{yy} = \mu \frac{B^2}{2} \left( -\sin^2 \frac{\pi z}{b} \sin^2(\omega t - \beta x) + \cos^2 \frac{\pi z}{b} \cos^2(\omega t - \beta x) \right)$$

$$= \frac{\mu B^2}{2} \left( \frac{1}{2} \cos \frac{2\pi z}{b} + \frac{1}{2} \cos 2(\omega t - \beta x) \right)$$

Again the second portion of the last equation, that is, the cosine containing $\omega$ may be neglected, and if the pressure is integrated over the entire top wall 10, that is, from $z=0$ to $z=b$, the equation vanishes. Accordingly, there is no net force over the entire top wall 10. On the other hand, if $p_{yy}$, the pressure acting on top wall 10, is not integrated over the entire surface of top wall 10 but, for example, only over the portion from $$z = \frac{b}{4} \text{ to } z = \frac{3}{4}b$$

the net force would not be zero. Thus, it is feasible to utilize a suitable portion of top wall 10 for measuring the mechanical force exerted by the wave traveling through wave guide 4 as long as the forces on the selected top wall portion act all in the same direction. The force acting on the entire surface of side wall 12 is given by Equation 5.

The force F, as given by Equation 5 and acting on side wall 12 has the appearance of a constant force. However, it has been assumed that the wave propagated through wave guide 4 is generated in pulses so that the force F, will appear as a series of square topped pulses recurring at an audio frequency. Diaphragm 14 is, therefore, arranged to be responsive to these pulses.

The magnitude of the force F, can now be calculated. The total electromagnetic power transmitted through wave guide 4 is given from page 475 of the publication above referred to as follows:

$$P = B^2 \mu \frac{\beta \omega b^2}{\pi^2} ab \text{ in watts} \quad (6)$$

This corresponds to a power density:

$$P' = B^2 \mu \frac{\beta \omega b^2}{\pi^2} \text{ in watts/sq.m.}$$

Thus $$F = \frac{P'}{4} A \frac{\pi^2}{\beta \omega b^2} \quad (7)$$

This may be written as follows:

$$F = \frac{P'}{16} A \frac{\lambda_g \lambda}{c b^2} \quad (8)$$

The unit of force of Equation 8 is $$\frac{\text{wattsec}}{m} = 10^5 \text{ dyne}$$

In a wave guide of rectangular cross-section, such as 4, which is excited in the $TE_{0,1}$ mode of transmission, $b$ must be larger than $\frac{1}{2}\lambda$ to keep above the cut-off wave length $\lambda_0 = 2b$. Accordingly, we may transform by utilizing Equation 2:

$$\frac{\lambda_g \lambda}{b^2} = \frac{\lambda^2/b^2}{\sqrt{1 - \lambda^2/4b^2}}$$

This equation is essentially independent of frequency because wave guides for different wave lengths will have practically the same value of $$\frac{\lambda}{b}$$

Let it be assumed that the power density P' developed by antenna 2 is $$1 \text{kw./sq. cm.} = 10^7 \frac{\text{watt}}{\text{sq. m}}$$

Let it further be assumed that $A=1$ sq. cm.$=10^{-4}$ sq. m. Then we find: for $b=0.6\lambda$, $F=.105$ dyne and for $b=\lambda$, $F=.024$ dyne.

Actually the power P is exerted only during short intervals of time. Referring now to Fig. 3, there are illustrated pulses 25 which may be developed by wave generator 1. The time duration $w$ of each pulse may, for example, be 2 microseconds or $2 \times 10^{-6}$ sec., while the pulses follow each other at time intervals of $T=10^{-3}$ sec. corresponding to an interrupting frequency of 1000 cycles per second. The force, therefore, varies with time as illustrated in Fig. 3 with $$\frac{w}{T} = \frac{2 \times 10^{-6}}{10^{-3}} = .002$$

The fundamental component of this force may be found by Fourier analysis and is $$\frac{2F}{\pi} \sin \frac{\pi W}{T}$$

or very nearly $$\frac{2w}{T}F$$

Thus, for the above two values of $b$, we obtain a force of $4 \times 10^{-4}$ and $10^{-4}$ dynes/sq. cm., respectively, acting on diaphragm 14. It will also be seen that the case where $b=.6\lambda$, that is, where the wave is not far from cutoff, is the more favorable. These values are approximately at or slightly below the threshold of sound perception. However, it should be realized that the force F which may actually be obtained may be increased by means of acoustic resonance. Furthermore, the value for the power density of 1 kw./sq. cm. which has been assumed is considerably below the radiation intensity of most radar transmitters, and also the value assumed above for the area A may be considerably increased. By means of the above equations the force exerted upon the walls of any wave guide by an electromagnetic wave of any transmission mode propagated through the guide may be calculated.

The mechanical force exerted by an electromagnetic wave upon tuned reed 6 may now be determined. This force is proportional to Poynting's vector $S = E \times H$ measured in watt/sq. m. The impulse acting on tuned reed 6 equals $$\frac{S}{c}$$

measured in watt sec./cu. m. Actually, for a material that reflects the wave, such as a metal, the impulse will be $$2\frac{S}{c}$$

With the same assumption as above $$S = 1 \text{ kw./sq. cm.} = 10^{10} \text{ dyne/sec. cm.}$$

we obtain for $$F = \frac{2 \times 10^{10}}{3 \times 10^{10}} \text{ dyne/sq. cm.} = 2/3 \text{ dyne/sq. cm.}$$

Since this force is periodically interrupted, the actual force acting on tuned reed 6 will be equal to $$2/3 \times .002 = 13.3 \times 10^{-4} \text{ dyne/sq. cm.}$$

Thus the force acting on reed 6 is of the same order of magnitude as that acting on diaphragm 14.

From the above calculation it will be evident that the electromagnetic field associated with an uninterrupted wave will also exert a continuous mechanical force on member 6 or on diaphragm 14. This constant mechanical force may be measured in any suitable conventional manner.

Referring now to Fig. 4, there is illustrated a portion of wave guide 4 which may be excited by antenna 2 in such a manner that an ultra-high frequency wave is propagated therethrough. Tuned reed 6 may be arranged in the electromagnetic field developed by antenna 2, while plate or wire grid 7 is stationary. In the manner explained hereinabove, a pulsed electromagnetic wave will exert a pulsating mechanical pressure upon tuned reed 6, thus causing it to vibrate.

The mechanical vibrations of tuned reed 6 may be measured electrically by utilizing the variations of the capacitance between reed 6 and stationary wire grid 7 which accordingly represent a condenser microphone. For the purpose of utilizing the capacitance variations for measuring the vibrations of reed 6, there may be provided amplifier 26 comprising cathode 27, control grid 28 and anode 30. Cathode 27 may be grounded as illustrated. Bias battery 31 and grid leak resistor 32 are connected in series between cathode 27 and control grid 28. Cathode 27 may be connected to tuned reed 6 through a further battery 29, while stationary wire grid 7 may be connected to control grid 28. Anode 30 is connected to a suitable anode voltage supply indicated at B+ through anode resistor 33.

Thus an alternating current is developed having a frequency which is equal to the interrupting frequency of the wave radiated by antenna 2. By means of volt meter 34 the voltage developed across anode resistor 33 may be measured. When the amplification of amplifier 26 as well as the capacitance of tuned reed 6 and wire grid 7 are known, volt meter 34 affords an indication of the absolute power of the electromagnetic wave.

The embodiment of the invention of Fig. 4 has the drawback that tuned reed 6 and wire grid 7 are arranged in the path of the electromagnetic wave and, therefore, will disturb the wave pattern. Accordingly, the arrangement shown in Fig. 2 where the electromagnetic wave excites diaphragm 14, forming part of side wall 12 of wave guide 4, is preferred because in that case the wave pattern is not disturbed. The mechanical vibrations of diaphragm 14 which are caused by the electromagnetic wave may be measured in the manner explained in connection with Fig. 4, that is, by means of a condenser microphone or the like.

It is also possible to couple an acoustically resonant system with vibratory diaphragm 14, as illustrated, for example, in Fig. 5, where a section of wave guide 4 has been illustrated. Vibratory diaphragm 14 may be connected to pipe 36 which may contain air and may be tuned acoustically to the interrupting frequency of the electromagnetic wave traveling through wave guide 4. Pipe 36 may be closed at its end, as illustrated, or open.

When diaphragm 14 vibrates as indicated in Fig. 5, a standing air wave is developed in pipe 36. This standing air wave may be utilized for measuring the amplitude of the vibrations of diaphragm 14. To this end either the velocity of the air flow at the ventral segment of velocity, that is, at the velocity loop of the air may be measured or the alternating pressure at the ventral segment of the pressure, that is, at the pressure loop. The air velocity measurement may be effected with any velocity-responsive device, such as, a preponderantly velocity responsive microphone, while the air pressure measurement may be effected with any preponderantly pressure responsive microphone, such as a carbon microphone.

As illustrated in Fig. 5, hot wire 37 is arranged at a velocity loop of the standing air wave in pipe 36. Wire 37 acts as a resistor and is provided for measuring the velocity of the air flow. Wire 37 may be connected to a suitable current source, such, for example, as battery 38, and preferably consists of a metal or alloy which changes its resistance appreciably with changes of temperature. The measurement of the resistance of wire 37 may be effected by a Wheatstone bridge comprising hot wire 37 and resistors 40, 41 and 42, one of which may be variable as illustrated. The bridge is adjusted until no current flows between the junction points of resistors 41 and 42, on the one hand, and resistor 40 and hot wire 37, on the other hand, as indicated by current meter 43. Then from the known resistances of resistors 40, 41 and 42, the resistance of hot wire 37 may be calculated. This, in turn, indicates the temperature of hot wire 37 wherefrom the energy loss caused by the velocity of the standing air wave in pipe 36 may be calculated. Another device which is responsive to the velocity of a standing air wave is a Rayleigh disc which may be arranged at an angle of 45 degrees to the direction of propagation of the wave. This disc will have a torsional moment due to the hydrodynamic force caused by the velocity of the air flow and tends to position itself at right angles to the direction of propagation of the wave. The force acting on a Rayleigh disc is independent of the frequency of the standing air wave.

Instead of measuring the velocity of the air flow the maximum movement of the air in pipe 36 may be determined. This may be effected by introducing smoke into pipe 36 or small oil drops or else a thin filament of glass or metal. Such indicating devices are taken along by friction of the moving air particles, and their movement may be measured, for example, with a microscope.

It is also feasible to provide a preponderantly pressure sensitive microphone of conventional construction at the pressure loop of the standing air wave in pipe 37, thereby to measure the amplitude of the vibrations of diaphragm 14.

With the embodiments of the invention illustrated in Figs. 4 and 5, power will be abstracted from the wave propagated through wave guide 4. If, for example, .1 watt of acoustical power is needed, this will, according to $$\frac{w}{T}=.002$$

be equivalent to 50 watts abstracted from the power radiated during each pulse plus unavoidable losses. This appreciable loss of power may be avoided by keeping diaphragm 14 stationary or motionless.

This may be accomplished by compensating electrically the mechanical force acting on diaphragm 14. Such an arrangement is illustrated in Fig. 6, where wave guide 4 including diaphragm 14 is mechanically coupled with tuned pipe 36 for developing a standing air wave therein. Wire grid or plate 45 is provided adjacent diaphragm 14. A sinusoidal wave is now impressed between diaphragm 14 and wire grid 45 for exactly compensating or counteracting the mechanical force acting on diaphragm 14.

For this purpose, there is provided sine wave generator 46 which may develop a sine wave at a frequency which is half as large as the interrupting frequency of the wave propagated through wave guide 4. Then, if the wave propagated through wave guide 4 is interrupted at a frequency of 1000 cycles per second, the frequency of the wave developed by generator 46 should be 500 cycles per second. Sine wave generator 46 is connected through variable resistor 47 with variable phase shifter 48. By means of variable resistor 47, the amplitude of the sine wave developed by generator 46 may be varied. By means of phase shifter 48, the phase of the output wave developed by generator 46 may be adjusted. The output of phase shifter 48 is connected between diaphragm 14 and wire grid 45, and the voltage applied thereto may be measured by volt meter 50. The reading of volt meter 50 therefore indicates the power developed by the wave propagated through wave guide 4.

For the purpose of determining whether diaphragm 14 is motionless, there may be provided carbon microphone 51 or any other suitable pressure responsive device arranged at the pressure loop of the standing air wave in pipe 36. Microphone 51 may be connected through amplifier 52 to loud speaker 53. The amplitude of the wave developed by generator 46 may now be adjusted by variable resistor 47 until loud speaker 53 indicates that diaphragm 14 is motionless. Alternatively, a velocity responsive device may be arranged at the velocity loop of the standing air wave in pipe 36 for determining whether diaphragm 14 is stationary.

Microphone 51, amplifier 52 and loud speaker 53 or another suitable measuring device connected to amplifier 52 may be arranged in Fig. 5 at the pressure loop of the standing air wave in pipe 36 for determining the amplitude of the vibrations of diaphragm 14.

In the embodiments of the invention illustrated in Figs. 4 to 6, the absolute power of the wave propagated through wave guide 4 may be measured directly. Alternatively, the measuring instrument may be calibrated by measuring first the power of a transmitter having a known power output.

While there has been described what are at present considered the preferred embodiments of the invention, it will be obvious to those skilled in the art that various changes and modifications may be made therein without departing from the invention, and, it is, therefore, aimed in the appended claims to cover all such changes and modifications as fall within the true spirit and scope of the invention.

What is claimed is:

1. A power measuring device comprising means for developing an electromagnetic wave and interrupting it at an audio frequency, a wave guide having a relatively wide wall and a relatively narrow wall, means for transmitting said wave through said wave guide to create an electromagnetic field, a portion of said relatively narrow wall being free to vibrate mechanically under the influence of the periodic mechanical pressure on said vibratory wall portion due to said electromagnetic field, electric means for compensating the mechanical force acting on said wall portion in such a manner as to keep said vibratory wall portion motionless, and means for measuring the force of said electric means required for compensating said mechanical force.

2. A power measuring device comprising means for developing an electromagnetic wave and interrupting it at an audio frequency, a wave guide having a relatively wide wall and a relatively narrow wall, means for transmitting said wave through said wave guide to create an electromagnetic field, a portion of said relatively narrow wall being tuned mechanically to said audio frequency and being free to vibrate mechanically under the influence of the periodic mechanical pressure on said vibratory wall portion due to said electromagnetic field, and means for measuring the amplitude of the vibrations of said vibratory wall portion.

3. A power measuring device comprising means for developing an electromagnetic wave and interrupting it at an audio frequency, a wave guide having a relatively wide wall and a relatively narrow wall, means for transmitting said wave through said wave guide to create an electromagnetic field, a portion of said relatively narrow wall being free to vibrate mechanically under the influence of the periodic mechanical pressure on said vibratory wall portion due to said electromagnetic field, an acoustically resonant system mechanically coupled to said vibratory wall portion, said vibratory wall portion being tuned mechanically to said audio frequency, and means for measuring the amplitude of the standing wave set up in said system.

4. A power measuring device comprising means for developing an electromagnetic wave and interrupting it at an audio frequency, a wave guide having a relatively wide wall and a relatively narrow wall, means for transmitting said wave through said wave guide to create an electromagnetic field, a portion of said relatively narrow wall being free to vibrate mechanically under the influence of the periodic mechanical pressure on said vibratory wall portion due to said electromagnetic field, an acoustically resonant system mechanically coupled to said vibratory wall portion, said vibratory wall portion being tuned mechanically to said audio frequency, and means for determining the pressure of the standing wave set up in said system.

5. A power measuring device comprising means for developing an electromagnetic wave and interrupting it at an audio frequency, a wave guide having a relatively wide wall and a relatively narrow wall, means for transmitting said wave through said wave guide to create an electromagnetic field, a portion of said relatively narrow wall being free to vibrate mechanically under the influence of the periodic mechanical pressure on said vibratory wall portion due to said electromagnetic field, an acoustically resonant system mechanically coupled to said vibratory wall portion, said vibratory wall portion being tuned mechanically to said audio frequency, and means for determining the velocity of the standing wave set up in said system.

HANS W. G. SALINGER.

REFERENCES CITED

The following references are of record in the file of this patent:

UNITED STATES PATENTS

| Number | Name | Date |
|---|---|---|
| 2,402,544 | Foulds | June 25, 1946 |

FOREIGN PATENTS

| Number | Country | Date |
|---|---|---|
| 459,484 | Belgium | July 30, 1945 |
| 548,861 | Great Britain | Oct. 20, 1942 |